US005787994A

United States Patent [19]
Friesen

[11] Patent Number: 5,787,994
[45] Date of Patent: Aug. 4, 1998

[54] NARROW PROFILE SOIL OPENING DEVICE FOR AGRICULTURE MATERIAL PLACEMENT

[75] Inventor: Randall M. Friesen, Garden City, Kans.

[73] Assignee: Acra Products, L.L.C., Garden City, Kans.

[21] Appl. No.: 759,005

[22] Filed: Dec. 2, 1996

[51] Int. Cl.$^6$ ...................................... A01B 15/00
[52] U.S. Cl. .................. 172/772.5; 172/771; 172/747; 172/748; 172/753; 111/139; 111/156
[58] Field of Search .................. 172/29, 772.5, 172/772, 771, 769, 765, 753, 720, 721, 713, 747, 748; 111/924, 923, 149, 152, 153, 154, 156, 139–143, 147; 37/447, 460, 446

[56] References Cited

U.S. PATENT DOCUMENTS

| | | | |
|---|---|---|---|
| 4,244,306 | 1/1981 | Peterson et al. | 111/924 X |
| 4,285,284 | 8/1981 | Van Der Lely | 111/147 X |
| 4,321,972 | 3/1982 | Robertson et al. | 111/153 X |
| 4,653,412 | 3/1987 | Clarke | 111/156 X |
| 4,762,075 | 8/1988 | Halford | 111/156 X |
| 5,159,985 | 11/1992 | Rowlett | 172/747 X |
| 5,310,009 | 5/1994 | Rowlett | 172/747 X |
| 5,370,070 | 12/1994 | Embree et al. | 111/139 |
| 5,413,056 | 5/1995 | Freed et al. | 172/29 X |
| 5,664,507 | 9/1997 | Bergland et al. | 111/140 |

*Primary Examiner*—Terry Lee Melius
*Assistant Examiner*—Victor Batson
*Attorney, Agent, or Firm*—Hovey, Williams, Timmons & Collins

[57] ABSTRACT

An opener assembly for forming a groove in soil in preparation for placement of substances in the soil broadly comprises an upright, elongated shank having a lower end and a lower mounting edge, a lowermost, groove-forming component, and fastening structure for fastening the component to the lower end of the shank. The component includes an upper mounting surface, and is configured to be seated against the lower mounting edge of the shank. The lower edge of the shank includes a pair of angularly disposed edge portions arranged to receive thrust loads in different directions from the component during groove-forming movement of the component through the soil. One of the edge portions lies at least partially in a normally horizontal plane for preventing upward movement of the component relative to the shank while the other of the edge portions lies at least partially in a normally vertical plane for preventing rearward movement of the component relative to the shank. The fastening structure is configured to permit pivotal and translational movement of the component with respect to the horizontal plane.

19 Claims, 2 Drawing Sheets

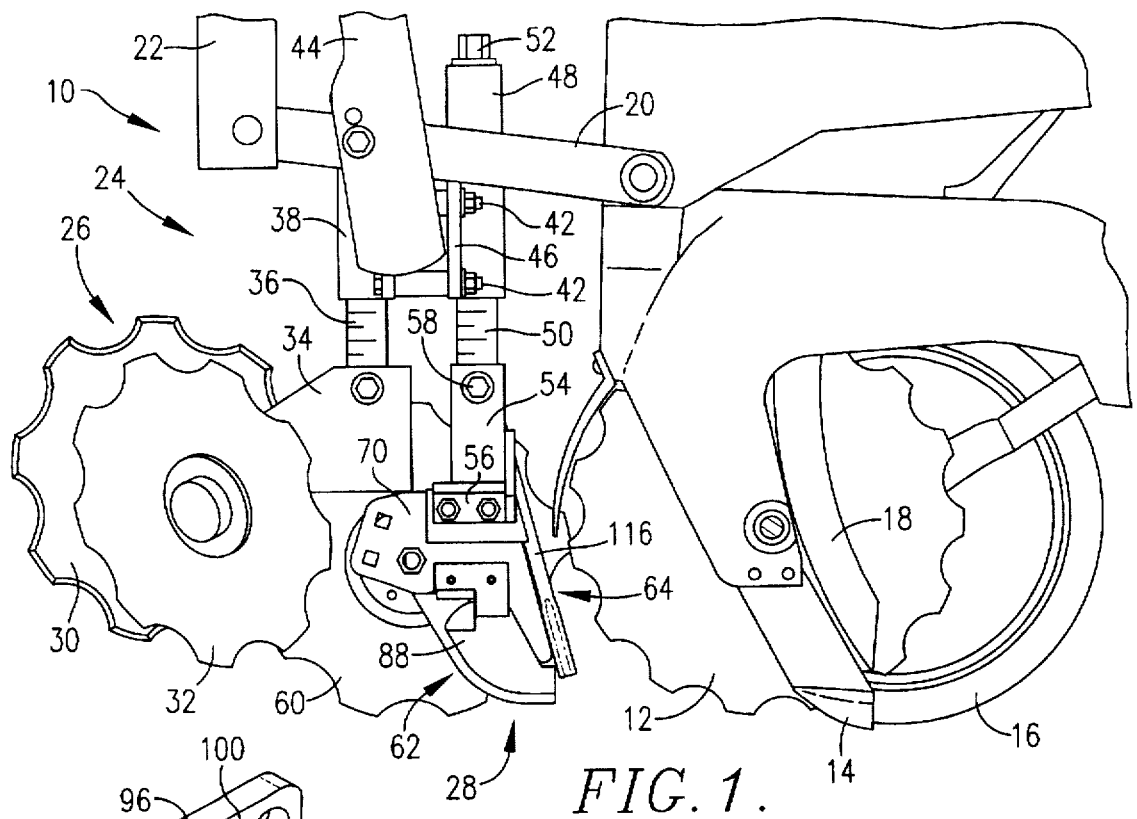
FIG. 1.
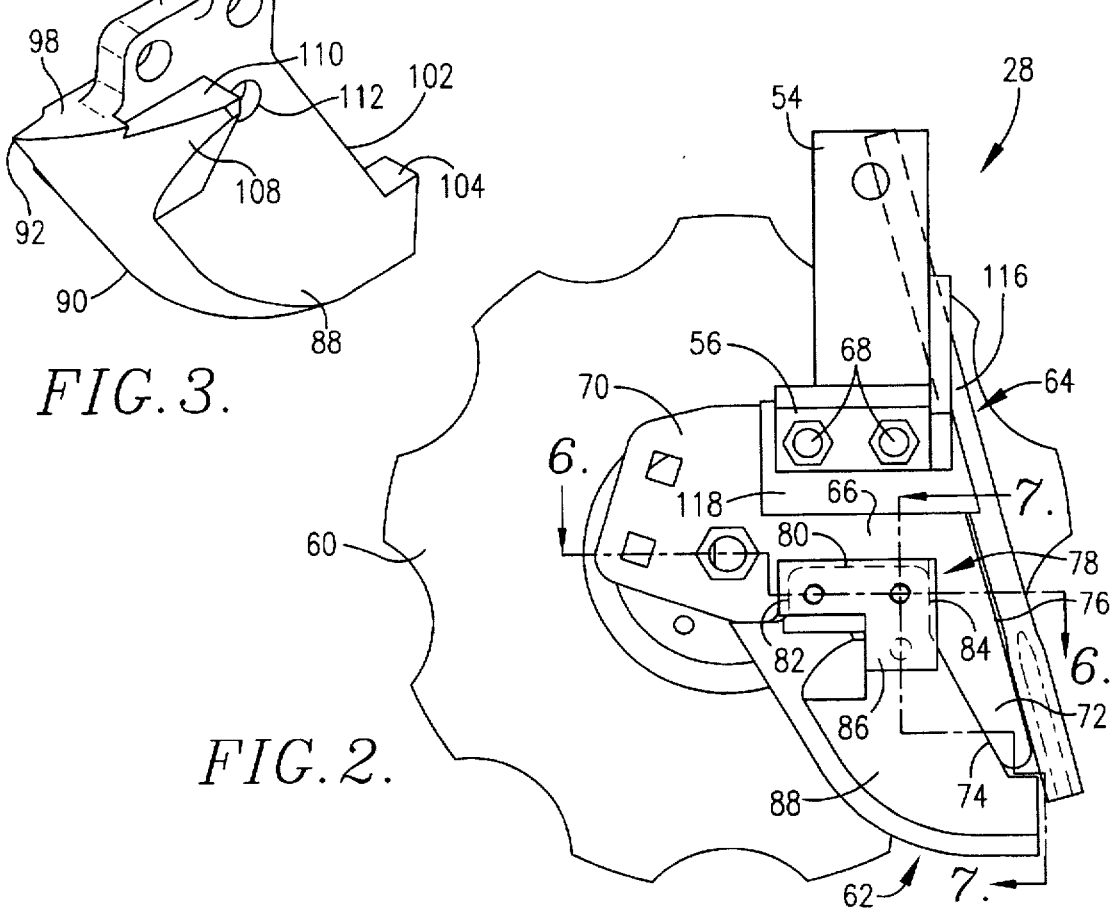
FIG. 3.
FIG. 2.

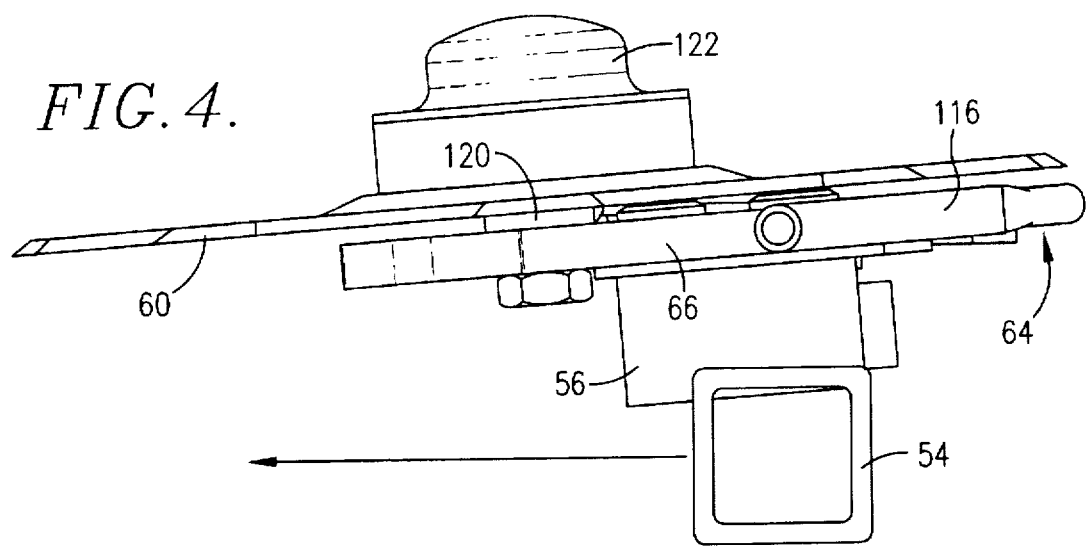
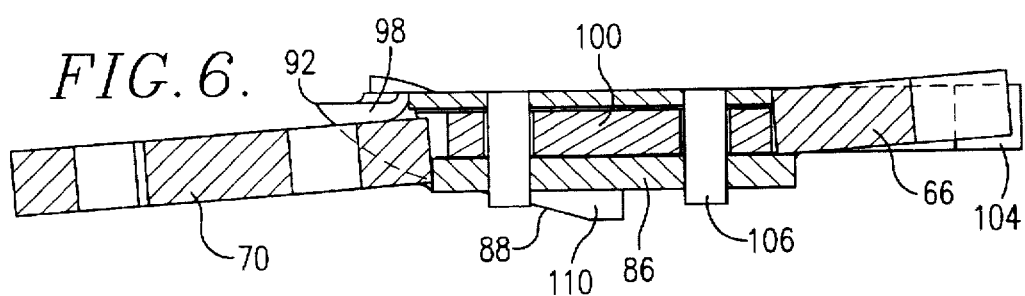
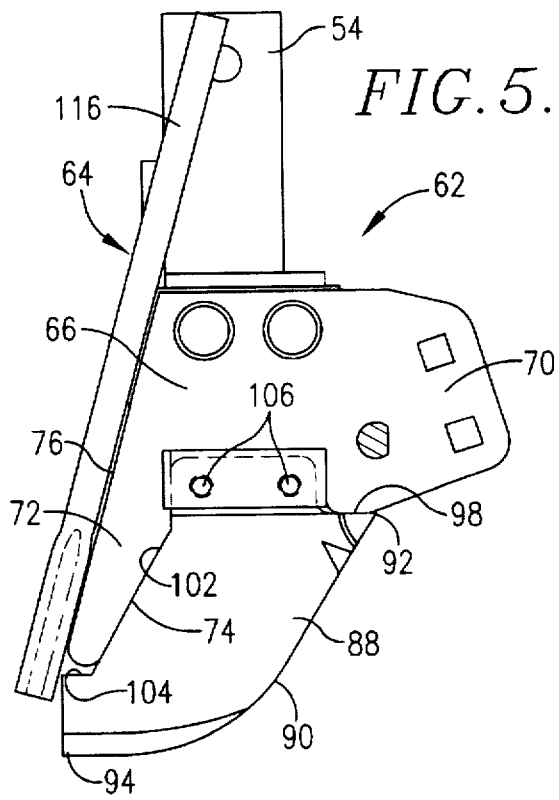
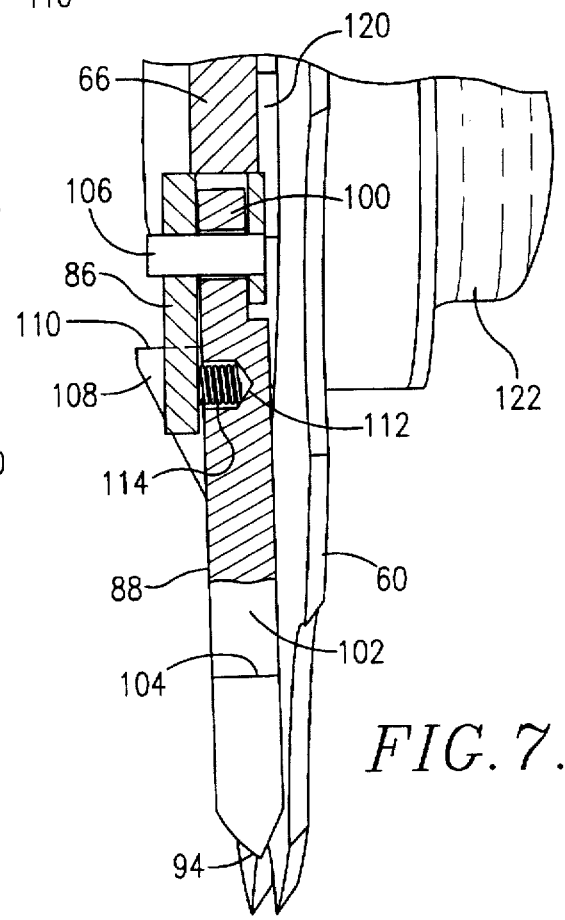

NARROW PROFILE SOIL OPENING DEVICE FOR AGRICULTURE MATERIAL PLACEMENT

BACKGROUND OF THE INVENTION

1. Field of the Invention

This invention relates generally to that type of farm equipment typically referred to as "planter attachments" and, more particularly, to a slimline or narrow profile attachment in front of a seed planter for adding nutrients or other substances to the soil through residue and trash left behind from the previous season.

2. Description of Prior Art

While a number of planter devices have previously been commercially available to place fertilizer alongside seed rows as the seeds are being planted, the growing trend in agriculture of planting in fields where residue from last season's crop is either partially or totally left on the surface increases the need to effectively handle the residue that is encountered by the planting equipment during the seed placement operations. Stalks, leaves, and other heavy residue can quickly accumulate, clog and jam the planting mechanism if it is not effectively cleared to one side, cut through and/or allowed to release and pass through the various mechanisms associated with the planter.

One known prior art planter device includes a pair of side-by-side, downwardly and forwardly converging discs rotatably disposed on opposite sides of a placement device located between the discs. U.S. Pat. No. 5,370,070, owned by Acra Products, L.L.C., the assignee of the present invention, discloses such a planter. The placement device of the planter includes a shank, a pair of trash-cutting discs rotatably mounted on the shank and a replaceable component rigidly mounted on the shank adjacent to each of the trash cutting discs. The components are configured to form a groove in the soil for placement of a substance in the soil. The components are also configured to prevent soil, stalks, leaves, and other residue from collecting on the trash-cutting discs by scraping the discs.

Many trash-cutting discs become warped during manufacture. As a result of the warping, the fixed component is unable to maintain continuous contact with the disc, reducing the effectiveness of a component in cleaning the disc. As a result, a significant and heretofore unsolved problem exists to provide a component for preventing clogging and jamming of a disc that is warped, and for permitting use of a single trash-cutting disc.

SUMMARY OF THE INVENTION

Accordingly, one important object of the present invention is to provide a device especially adapted for, but not necessarily limited to, use as a planter attachment which is of significantly improved, slim-line or narrow profile design to enable it to properly place its fertilizer or other substance into the soil while more effectively shedding and avoiding the buildup of trash residue encountered by the device in the vicinity of the seed bed. In carrying out this object, the present invention contemplates a new mounting arrangement for the metal "insert" or groove-forming component at the bottom of the shank associated with the device such that the component is permitted to swing outwardly so that an edge of the component is positioned to continually prevent the accumulation of residues on a trash-cutting disc, even if the disc is warped.

More specifically, the present invention contemplates having the insert component attached to its mounting shank by fastening structure that permits outward swinging movement while the shank prevents upward and rearward movement of the component with respect to the shank. The insert component is provided with an angularly configured top edge defining a flange that is matingly received up into a notched lower portion of the shank. A pair of fastening elements are received through a pair of sets of corresponding holes formed in the flange and shank lower portion. The fastening elements are slightly smaller than the flange holes so that the component is loosely fitted to the shank so that the component is permitted to move outwardly while the shank lower portion prevents upward and rearward movement of the component. Structure is also provided for biasing the component in a direction toward the trash-cutting disc.

As a result of the improved fastening structure, a placement device is provided that includes a single trash-cutting disc. By providing a single disc, it will be appreciated that the placement device is relatively narrower than the prior art two-disc placement devices.

DESCRIPTION OF THE DRAWING FIGURES

FIG. 1 is a fragmentary, left side perspective view of a planter provided with an attachment that includes a fertilizer placement device in accordance with the principles of the present invention, the illustrated planter being of the double-disc opener type;

FIG. 2 is a side elevational view of the fertilizer placement device;

FIG. 3 is a left front perspective view of a groove-forming insert component of the fertilizer placement device;

FIG. 4 is a plan view of the fertilizer placement device;

FIG. 5 is a side elevational view of the shank and insert component of the fertilizer placement device;

FIG. 6 is a sectional view of the fertilizer placement device taken along line 6—6 of FIG. 2; and FIG. 7 is a sectional view of the fertilizer placement device taken along line 7—7 of FIG. 2.

DETAILED DESCRIPTION OF THE PREFERRED EMBODIMENT

The placement device of the present invention is hereinafter described in connection with the application of fertilizer and other nutrients. However, it will be appreciated that there may be other beneficial uses of the placement device including, for example, seed placement itself, and therefore the description which follows should not be taken in a limiting sense, but rather only as being illustrative. Furthermore, the inventive device need not be utilized in combination with a planter, but may instead be used independently of such equipment.

The planter 10 illustrated in FIG. 1 is of the double disc opener type having a pair of side-by-side discs 12 (only one being shown) situated on opposite sides of a central, upright, groove shaping tool 14, as well understood by those skilled in the art. In the particular type planter selected for illustration, a depth gauging wheel 16 runs alongside of the discs 12 and shaping tool 14 to limit the depth of penetration of those devices. A seed tube 18 delivers a steady stream of seeds from a source of supply, not shown, for dropping the seeds in succession immediately behind the tool 14. Fore-and-aft parallel links 20 connect the planter unit 10 with mounting structure 22 associated with a transverse tool bar (not shown) to which a plurality of the units 10 are connected for pulling through the field.

In the illustrated embodiment, the planter 10 is provided with an attachment broadly denoted by the numeral 24 which includes a trash clearing device 26 and a fertilizer placement device 28 in accordance with the principles of the present invention. The trash clearing device 26 chosen for purposes of illustration takes the form of a product sold by Acra Products, L.L.C., the assignee of the present invention, under the trade designation "Trash Whipper" and broadly includes a pair of ground-driven, downwardly and forwardly converging, fluted discs 30,32 mounted on a common mount 34 that is secured to the lower end of a vertically adjustable stem 36. The stem 36 is telescopically received within an upright, square tube 38 that is fixedly secured to a square cross sleeve (not shown) by a plurality of bolts 42. The cross sleeve is positioned horizontally and comprises part of what may be termed a supporting platform for the trash clearing device 26 and the fertilizer placement device 28, the rest of such supporting platform comprising a pair of upright arms 44 (only one arm being shown in FIG. 1) which are secured to the parallel links 20 and which have respective, inwardly projecting, square stub tubes at their lower ends projecting telescopically into the opposite open ends of a cross sleeve. Suitable retaining means such as a vertical bolt lock the stub tubes within the cross sleeve such that the supporting platform which comprises the arms 44, stub tubes, and cross sleeve is rendered generally U-shaped in overall configuration.

The placement device 28 is secured to the back side of the cross sleeve by the same bolts 42 used to attach the trash clearing device 26 to the front side of the cross sleeve. Such bolts 42 are secured to outwardly projecting flanges 46 (only one being shown in FIG. 1) on an upright square tube 48 that is part of the vertical adjustment means for the placement device 28. Such vertical adjustment means is similar to that provided on the front side of the cross sleeve with respect to the trash clearing device 26 and includes an upright square stem 50 telescopically received within the tube 48 and moveable in its vertical adjusting position by means of an adjusting bolt 52 which is accessible from the top of the tube 48 and which is threadably engaged with the stem 50 within the interior of the tube 48.

As perhaps shown best in FIG. 2, the stem 50 at its lower end fits into an upright, tubular hub 54 having an offset placement device mount 56, angled approximately 4° with respect to hub 54, and configured to support the fertilizer placement device 28. The stem 50 is fixedly secured to the hub 54 by a bolt 58.

The placement device 28 illustrated in FIG. 2 takes the form of a product sold by Acra Products, L.L.C., under the trade designation "Acra Place". The placement device 28 broadly consists of three major parts, i.e., a trash cutting disc 60, an upright opener assembly 62 that opens a groove in the soil, and a delivery tube assembly 64 that places the fertilizer into the groove formed by the opener assembly 62. The disc 60 is shown as a concaved notched blade, but may also be a tined wheel, sold by Acra Products, L.L.C., under the trade designation "Zone Manager".

The opener assembly 62 includes a main supporting shank 66 fabricated from a flat metal plate and oriented in such a way that the opposite flat sides of the plate define the lateral sides of the shank 66 while the narrower opposite edges of the plate define the front and rear extremities of the shank 66. As noted particularly in FIG. 4, the upper end of the shank 66 lies flatly alongside of and against the mount 56 and is secured thereto by a pair of bolts 68. As a result, the shank 66 is angled approximately 4° with respect to the hub 54.

The shank 66 includes a nose portion 70 and a downwardly and rearwardly projecting toe 72 defined between a generally diagonal edge portion 74 and a trailing edge portion 76. The shank 66 is notched out at its lower end to present a downwardly facing notch 78 formed from a generally horizontal edge portion 80 and a pair of generally vertical edge portions 82,84. An L-shaped insert mounting plate 86, having a pair of holes formed therethrough is secured to the shank 66 adjacent to the notch 78. As shown in FIG. 6, the plate 86 is angled approximately 4° with respect to the shank 66.

The opener assembly 62 further includes an insert component 88. As shown in FIG. 3, the insert component 88 comprises a generally flat, generally crescent-shaped metal body having a pair of opposite flat sides that taper and converge to a continuous leading, convex, narrow edge 90 which extends continuously from the upper front extremity 92 of the body to the lower rear terminus 94 thereof. The component 88 further includes a mounting surface 96 defining a forward step surface 98 adjacent to the upper front extremity 92, an upstanding flange portion 100 and a downwardly and rearwardly extending back edge 102. The component 88 is configured along its back edge 102 to present a rear step surface 104 adjacent to the lower rear terminus 94. As a result, the component 88 is configured to be seated against the lower end of the shank 66 with the flange 100 seated against the mounting plate 86, the forward step surface 98 seated against the nose portion 70, and the rear step surface 104 seated against the toe 72. It will be appreciated that the notch 78 and diagonal edge portion 74 of the shank 66 cooperably prevent upward and rearward movement of the component 88 relative to the shank 66.

When the component 88 is in position, the holes in the mounting plate 86 are aligned with a pair of holes formed through the flange 100. A pair of fastening elements 106 are received through the aligned holes to fasten the component 88 to the shank 66. The fastening elements 106 are slightly smaller than the holes in the flange 100 of the component 88. It will be appreciated that diagonal edge portion 74 and edges 80,82 of notch 78 provide sliding load bearing surfaces for mounting surface 96 of component 88. Therefore, the component 88 is permitted to pivot or swing outwardly from the trash cutting disc 60 while being prevented from upward and rearward movement relative to the shank 66.

In an alternative form, the opener assembly 62 is provided with a hinge (not shown) for mounting the component 88 to the shank 66. It will be appreciated that a hinge would provide a fastening structure for fastening the component 88 to the shank 66 and permit pivotal and translational movement of the component.

A stop element 108 presenting a stop surface 110 is provided on one side of the component 88 for limiting the travel of the component 88 while swinging outwardly during use. In addition, a recess 112 is formed in one side of the component 88 and is configured to receive a spring 114. The spring 114 bears against the mounting plate 86 to bias the component 88 in a direction toward the disc 60 to keep edge 92 in contact with the disc 60.

Preferably, the component 88 is constructed from an abrasionresistant cast iron which falls within ASTM specification A532, Class II, Type E. A preferred composition of the abrasion-resistant cast iron includes: Chrome 19.0–21.0%; Carbon 3.10–3.30%; Silicon 0.60–0.70%; Manganese 0.65–0.80%; Molybdenum 0.95–1.15%; Sulfur less than 0.03%; Phosphorus less than 0.05%. Castings made in accordance with the foregoing composition are cooled in the mold until reaching 200° F., or less.

The delivery tube assembly 64 includes a long, straight metal tube 116 of circular cross-sectional configuration which is no wider than the shank 66 and which lies flatly up against and extends along the trailing edge 76 thereof. The upper end of the tube 116 extends upwardly beyond the upper end of the shank 66. The assembly 64 also includes a flat mounting plate 118 adjacent the upper end of the tube 116 which is fixed to the latter and projects forwardly therefrom into position alongside the outer face of the shank 66. A pair of mounting holes in the plate 118 provide clearance for the respective bolts 68 for the purpose of providing means of attaching the tube 116 to the shank 66.

The trash cutting disc 60 is attached to the shank 66 at the forwardly projecting nose portion 70 thereof. The disc 60 is preferably of the flat blade, fluted periphery type, as well known by those skilled in the art, so as to provide a clean and sharp cutting action as it rolls along the ground in contacting engagement with the surface residue. As illustrated particularly in FIG. 4, the disc 60 is rotatably mounted to the shank 66 by a threaded shank (not shown) which is threadably received by a cross bore defined through the nose portion 70. In the illustrated embodiment, the disc 60 is provided with a stack of spacer shims 120 that space the body of the disc 60 outwardly from the shank 66. The disc 60 also includes an internal bearing assembly (not shown) housed interiorly of the hub 122.

OPERATION

In use, it is believed apparent that the fertilizer placement device 28 will move through a largely cleared path left by the trash clearing device 26 and place bands or ribbons of fertilizer on opposite sides of the seed row being deposited by the planter 10. As shown in FIG. 4, the disc 60 is configured to rotate in a generally vertical plane that is angled approximately 4° with respect to the direction of travel of the planter 10 (denoted by the arrow). By attaching the mounting plate 86 at an angle of approximately 4° with respect to the shank 66, the component 88 is generally in alignment with the direction of travel of the planter 10. The resultant angle between the component 88 and disc 60, in combination with the biasing force of the spring 114, urges the edge 90 of the component 88 to continually stay in contact with the disc 60 for cleaning the disc 60. As a result of the improved fastening structure for fastening the component 88 to the shank 66 while permitting pivotal and translational movement of the component 88, the component 88 is permitted to stay in contact with the disc 60 for cleaning the disc 60 even when the disc 60 is warped.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. An opener assembly for forming a groove in soil in preparation for placement of substances in the soil, said opener assembly comprising:

an upright, elongated shank having a lower end and a lower mounting edge;

a lowermost, groove-forming component, said component having an upper mounting surface; and fastening structure for fastening said component to said lower end of said shank with said upper mounting surface of said component adjacent to said lower edge of said shank, said lower edge of said shank including a pair of angularly disposed edge portions arranged to receive thrust loads in different directions from said component during groove-forming movement of said component through the soil, one of said edge portions lying at least partially in a normally horizontal plane for preventing upward movement of said component relative to said shank and the other of said edge portions lying at least partially in a normally vertical plane for preventing rearward movement of said component relative to said shank, said fastening structure permitting pivotal and translational movement of said component with respect to said horizontal plane.

2. The opener assembly as set forth in claim 1, wherein said fastening structure includes a mounting plate coupled with the lower end of the said shank and angled with respect to said shank so that said component is fastened to said shank at an angle with respect thereto.

3. The opener assembly as set forth in claim 2, wherein said angle between said mounting plate and said shank is approximately 4°.

4. The opener assembly as set forth in claim 1, wherein said upper mounting surface of said component defines a flange having an opening formed therethrough, and said fastening structure includes a plate attached to the lower end of said shank having an opening formed therethrough, and a fastening element received through the openings of said plate and said flange, said fastening element being slightly smaller than said opening through said flange for permitting the pivotal and translational movement of said component.

5. The opener assembly as set forth in claim 1, wherein said component includes a stop element presenting a stop surface configured to engage the lower end of said shank for limiting the pivotal and translational movement of said component.

6. In an agricultural device for placing substances in soil and having a disc rotatably disposed on a side of an opener assembly, said opener assembly comprising:

an upright, elongated shank having a lower end and a lower mounting edge;

a lowermost, groove-forming component, said component having an upper mounting surface; and fastening structure for fastening said component to said lower end of said shank adjacent to the disc with said upper surface of said component adjacent to said lower edge of said shank, said lower edge of said shank including a pair of angularly disposed edge portions arranged to receive thrust loads in different directions from said component during groove-forming movement of said component through the soil, one of said edge portions lying at least partially in a normally horizontal plane for preventing upward movement of said component relative to said shank and the other of said edge portions lying at least partially in a normally vertical plane for preventing rearward movement of said component relative to said shank, said fastening structure permitting pivotal and translational movement of said component with respect to said horizontal plane.

7. The opener assembly as set forth in claim 6, wherein said fastening structure includes a mounting plate coupled with the lower end of the said shank and angled with respect to said shank so that said component is fastened to said shank at an angle with respect to the disc.

8. The opener assembly as set forth in claim 7, wherein said angle between said mounting plate and said disc is approximately 4°.

9. The opener assembly as set forth in claim 7, said component including a downwardly and rearwardly extending leading edge, said edge being configured for forming a groove in the soil and for scrapping the disc for preventing foreign material from accumulating on the disc.

10. The opener assembly as set forth in claim 6, wherein said upper mounting surface of said component defines a flange having an opening formed therethrough, and said fastening structure includes a plate attached to the lower end of said shank having an opening formed therethrough, and a fastening element received through the openings of said plate and said flange, said fastening element being slightly smaller than said opening through said flange for permitting the pivotal and translational movement of said component.

11. The opener assembly as set forth in claim 6, wherein said component includes a stop element presenting a stop surface configured to engage the lower end of said shank for limiting the pivotal and translational movement of said component.

12. The opener assembly as set forth in claim 6, further including structure for biasing said component in a direction toward the disc.

13. The opener assembly as set forth in claim 12, wherein said biasing structure includes a spring retained between said component and said fastening structure.

14. An agricultural attachment device for placing substances in the soil having a trash clearing device and a placement device located behind said trash clearing device, said placement device comprising:

an upright, elongated shank having a lower end and a lower mounting edge;

a trash-cutting disc including a pair of opposed disc faces, said disc being mounted on said lower end of said shank for rotation about a transverse axis;

a lowermost, groove-forming component, said component having an upper mounting surface and a forward leading edge; and fastening structure for fastening said component to said lower end of said shank adjacent to one of said faces of said trash-cutting disc with said upper surface of said component adjacent to said lower edge of said shank, said lower edge of said shank including a pair of angularly disposed edge portions arranged to receive thrust loads in different directions from said component during groove-forming movement of said component through the soil, one of said edge portions lying at least partially in a normally horizontal plane for preventing upward movement of said component relative to said shank and the other of said edge portions lying at least partially in a normally vertical plane for preventing rearward movement of said component relative to said shank, said fastening structure permitting pivotal and translational movement of said component with respect to said horizontal plane.

15. The opener assembly as set forth in claim 14, wherein said fastening structure includes a mounting plate coupled with the lower end of the said shank and angled with respect to said shank so that said component is fastened to said shank at an angle with respect to said disc.

16. The opener assembly as set forth in claim 15, said component including a downwardly and rearwardly extending leading edge, said edge being configured for forming a groove in the soil and for scrapping said disc for preventing foreign material from accumulating on said disc.

17. The opener assembly as set forth in claim 14, wherein said component includes a stop element protruding from a side of said component, said element presenting a stop surface configured to engage the lower end of said shank for limiting the pivotal and translational movement.

18. The opener assembly as set forth in claim 14, further including structure for biasing said component in a direction toward said disc.

19. The opener assembly as set forth in claim 18, wherein said biasing structure includes a spring retained between said component and said fastening structure.

* * * * *